(12) United States Patent
Tan et al.

(10) Patent No.: US 10,791,868 B2
(45) Date of Patent: Oct. 6, 2020

(54) COFFEE PROCESSING APPARATUS AND METHOD

(71) Applicant: KONINKLIJKE PHILIPS N.V., Eindhoven (NL)

(72) Inventors: Jingwei Johannes Maria Tan, Eindhoven (NL); Jun Shi, Eindhoven (NL); Jun Zhou, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/526,095

(22) PCT Filed: Nov. 10, 2015

(86) PCT No.: PCT/EP2015/076224
§ 371 (c)(1),
(2) Date: May 11, 2017

(87) PCT Pub. No.: WO2016/075147
PCT Pub. Date: May 19, 2016

(65) Prior Publication Data
US 2017/0303731 A1 Oct. 26, 2017

(30) Foreign Application Priority Data

Nov. 14, 2014 (WO) ................. PCT/CN2014/091089
Mar. 17, 2015 (EP) ..................................... 15159335

(51) Int. Cl.
*A47J 31/42* (2006.01)
*A47J 31/44* (2006.01)
(Continued)

(52) U.S. Cl.
CPC ................. *A47J 31/42* (2013.01); *A23F 5/08* (2013.01); *A23F 5/26* (2013.01); *A23F 5/262* (2013.01);
(Continued)

(58) Field of Classification Search
CPC ...... A23F 5/00; A23F 5/08; A23F 5/10; A23F 5/105; A23F 5/26; A23F 5/262;
(Continued)

(56) References Cited

U.S. PATENT DOCUMENTS 4,267,200 A * 5/1981 Klien ........................ A23F 5/12
426/388
4,496,817 A * 1/1985 Smith .................... H05B 6/666
219/707

(Continued)

FOREIGN PATENT DOCUMENTS

CN 102395304 A 3/2012
CN 203336086 A 10/2013
(Continued)

OTHER PUBLICATIONS

Kathurima Cecilia et al., "Volatile Organic Compounds in Brewed Kenyan Arabica Coffee Genotypes by Solid Phase Extraction Gas Chromatography Mass Spectrometry", 2012, Food Science and Quality Management, vol. 8, pp. 20, 21, and 25. (Year: 2012).*

(Continued)

*Primary Examiner* — Drew E Becker
*Assistant Examiner* — Bryan Kim
(74) *Attorney, Agent, or Firm* — Schott PC.

(57) ABSTRACT

A coffee processing apparatus (100, 200, 300) is disclosed that comprises at least one of a grinding stage (110) for grinding coffee beans (10) into ground coffee beans (20); and a brewing stage (140) for brewing coffee from ground coffee beans; the coffee processing apparatus further comprising a sensor (150) arranged to sense a total concentration of volatile organic compounds released by said coffee beans or ground coffee beans; and a controller (160) responsive to said sensor and arranged to control said grinding stage and/or said brewing stage as a function of said total con- (Continued)

centration. Methods of controlling such a coffee processing apparatus are also disclosed.

18 Claims, 7 Drawing Sheets

(51) Int. Cl.
    *A23F 5/26*     (2006.01)
    *A23F 5/08*     (2006.01)
    *A47J 31/00*     (2006.01)
    *A47J 31/40*     (2006.01)
    *A47J 31/41*     (2006.01)

(52) U.S. Cl.
    CPC .............. *A47J 31/002* (2013.01); *A47J 31/44* (2013.01); *A47J 31/402* (2013.01); *A47J 31/404* (2013.01); *A47J 31/41* (2013.01)

(58) Field of Classification Search
    CPC .. A23F 5/265; A23F 5/267; A23F 3/12; A23F 3/16; A23F 3/18; A23F 5/04; A23F 5/043; A23F 5/046; A23F 2200/00; G01N 33/00; G01N 33/0001; G01N 33/0004; G01N 33/02; G01N 33/14; G01N 33/143; G01N 33/146
    USPC ......... 99/279, 280, 281, 282, 283, 284, 285, 99/286, 287, 288; 73/23.2, 23.34–23.42
    See application file for complete search history.

(56) References Cited

U.S. PATENT DOCUMENTS

| | | | | |
|---|---|---|---|---|
| 4,591,508 A * | 5/1986 | Pultinas, Jr. | ............... | A23F 5/10 426/466 |
| 4,874,928 A * | 10/1989 | Kasai | ................... | H05B 6/6458 219/492 |
| 5,337,652 A * | 8/1994 | Fischer | ................... | A47J 31/32 99/281 |
| 5,352,867 A * | 10/1994 | Shota | ................... | H05B 6/6458 219/497 |
| 5,901,634 A * | 5/1999 | Vancamp | ............... | A47J 31/002 99/281 |
| 6,495,180 B1 * | 12/2002 | Gurol | ........................ | A23F 5/14 426/309 |
| 6,537,596 B1 * | 3/2003 | Junior | ....................... | C12C 7/01 241/12 |
| 6,607,768 B1 * | 8/2003 | Eichner | ................... | A23F 5/046 34/360 |
| 6,783,089 B2 * | 8/2004 | Lassota | ................... | A47J 31/42 241/30 |
| 7,748,314 B2 * | 7/2010 | Hahm | ..................... | F25D 23/12 219/506 |
| 9,357,871 B2 * | 6/2016 | Coccia | ..................... | A47J 31/36 |
| 9,460,633 B2 * | 10/2016 | Minvielle | .......... | G06Q 30/0207 |
| 2005/0178185 A1 * | 8/2005 | Negri | ................. | G01N 33/0031 73/23.34 |
| 2008/0053990 A1 * | 3/2008 | Kruempelmann | ........ | F24C 7/08 219/707 |
| 2008/0193614 A1 * | 8/2008 | Greiner | ..................... | F24C 7/08 426/231 |
| 2010/0318230 A1 | 12/2010 | Liu | | |
| 2011/0038998 A1 | 2/2011 | Kohli | | |
| 2013/0156921 A1 * | 6/2013 | Veltrop | ............... | A47J 36/2488 426/531 |
| 2013/0200101 A1 * | 8/2013 | Dooley | ................. | A47J 31/404 222/129.4 |
| 2013/0203180 A1 | 8/2013 | Robinson | | |
| 2014/0230662 A1 * | 8/2014 | Siegel | ................. | F24C 15/2021 99/344 |
| 2014/0242239 A1 | 8/2014 | Boggavarapu | | |
| 2014/0314921 A1 * | 10/2014 | Kuempel | ................. | H04L 67/10 426/231 |
| 2015/0033948 A1 * | 2/2015 | Lawson | ................. | A47J 31/007 99/289 R |
| 2015/0140184 A1 * | 5/2015 | Fu | ........................... | A23F 5/105 426/231 |
| 2015/0351581 A1 * | 12/2015 | Li | .......................... | H04W 4/80 426/231 |
| 2016/0161460 A1 * | 6/2016 | Druon | ..................... | A23C 9/13 250/282 |

FOREIGN PATENT DOCUMENTS

| | | | | |
|---|---|---|---|---|
| CN | 203378977 U | | 1/2014 | |
| JP | 2001104161 A | * | 4/2001 | ............. A47J 31/70 |
| WO | 2013171436 A1 | | 11/2013 | |

OTHER PUBLICATIONS

Black Bear NPL, published Jun. 26, 2013, https://web.archive.org/web/20130726012250/https://blackbearcoffee.com/resources/81 (Year: 2013).*

JP2001104161A translation, published Apr. 17, 2001 (Year: 2001).*

* cited by examiner

COFFEE PROCESSING APPARATUS AND METHOD

This application is the U.S. National Phase application under 35 U.S.C. § 371 of International Application No. PCT/EP2015/076224, filed on Nov. 10, 2015, which claims the benefit of International Application No. PCT/CN2014/091089 filed on Nov. 14, 2014 and International Application No. 15159335.7 filed on Mar. 17, 2015. These applications are hereby incorporated by reference herein.

FIELD OF THE INVENTION

The present invention relates to a coffee processing apparatus comprising at least one of a grinding stage for grinding coffee beans into ground coffee beans and a brewing stage for brewing coffee from ground coffee beans such as a coffee brewing apparatus or a coffee grinding apparatus.

The present invention further relates to a method of controlling a grinding stage and/or brewing stage of such a coffee processing apparatus.

BACKGROUND OF THE INVENTION

Coffee has become one of the most popular beverages in modern society, with many different types and flavours of coffee being routinely available to a consumer, either in outlets such as coffee shops or in supermarkets for domestic use. The evolution of the popularity of coffee as a beverage has caused a shift in how coffee is being consumed, for instance in domestic settings.

One of the challenges in coffee brewing is to ensure that the brewed coffee has a consistent taste, i.e. a taste as expected by the consumer. This is not trivial as the taste of the coffee is directly correlated to the quality of the ground coffee beans used in the brewing process; it is of course well-known that ground coffee will lose some of its flavour with age, such that coffee brewed from older ground coffee typically will have a different flavour than coffee brewed from fresh ground coffee. Even freshly ground coffee from old roasted coffee beans suffers from such aging processes.

This may deter users from purchasing coffee processing apparatuses, e.g. coffee makers, because the quality of the coffee produced by such coffee processing apparatuses is considered inconsistent. Although the user is often aware that this is caused by the aging of the ground coffee used in a brewing process, the need to have to purchase freshly ground coffee or fresh coffee beans at a regular basis and discarding large amounts of stale coffee products in order to ensure brewed coffee being produced that has the desired taste annoys a significant amount of consumers, as this is considered wasteful and economically undesirable.

SUMMARY OF THE INVENTION

The present invention seeks to provide a coffee processing apparatus including at least one of a grinding stage for grinding coffee beans into ground coffee beans and a brewing stage for brewing coffee from ground coffee beans that can process the coffee in an intelligent manner such that coffee aging effects can be compensated for.

The present invention further seeks to provide a method of controlling a grinding stage and/or brewing stage of a coffee processing apparatus in such an intelligent manner.

According to an aspect, there is provided a coffee processing apparatus comprising at least one of a grinding stage for grinding coffee beans into ground coffee beans and a brewing stage for brewing coffee from ground coffee beans; the coffee processing apparatus further comprising a sensor arranged to sense a total concentration of volatile organic compounds released by said coffee beans or ground coffee beans; and a controller responsive to said sensor and arranged to control said grinding stage and/or said brewing stage as a function of said total concentration.

The present invention is based on the insight that the age of roasted coffee beans, either in whole or ground form, is related to the amount of volatile organic compounds released by the coffee beans, which is correlated to the flavour of a coffee product brewed from such coffee beans. Consequently, by determining this amount, the coffee beans may be processed as a function of the amount of VOCs released by the coffee beans either in whole or ground form such that the loss of flavour from the coffee beans may be compensated for in the brewing process.

For example, where the coffee processing apparatus comprises a grinding stage, the sensor may be arranged to sense a total concentration of volatile organic compounds released by said coffee beans in a container of the grinding stage in order to determine this concentration, for instance to control the grinding process of the coffee beans, e.g. the amount and/or the granularity of ground coffee being produced by the grinding stage.

The container may comprise a compartment that is filled with coffee beans during normal use, wherein the sensor is in fluid connection with said compartment. This ensures a substantially constant amount of coffee beans being sensed such that the total concentration of VOCs can be related to this substantially constant amount, thus avoiding the need to determine the amount of coffee beans being sensed.

For such a grinding stage, the sensor may be arranged to sense a total concentration of volatile organic compounds released by said ground coffee beans produced by said grinding stage, in which case the controller may be adapted to control the grinding of a sufficient amount, i.e. a relatively constant amount, of the coffee beans for the detection of said total concentration, thus avoiding the need to determine the amount of coffee beans being sensed.

The grinding stage may further comprises a shutter for blocking the release of ground coffee beans, wherein the controller is further adapted to control said shutter as a function of said total concentration. This for instance allows for the control of the amount of ground coffee beans being released by the grinding stage such that the strength and flavour of the coffee to be brewed may be controlled by controlling the amount of ground coffee released.

In an embodiment, the coffee processing apparatus comprises the brewing stage, wherein the brewing stage comprises a water dispensing stage under control of said controller arranged to dispense a first amount of water onto the ground coffee beans, said amount being determined as a function of said total concentration. By controlling the amount of water to be released on a known quantity of ground coffee beans as a function of the total concentration of VOCs released by the coffee beans, the ultimate flavour of the brewed coffee product may be controlled.

The water dispensing stage may be further arranged to dispense a second amount of water into coffee brewed by said brewing stage, said second amount being determined as a function of said total concentration. This for instance may be used to reduce the strength of a brewed coffee product, if such a reduction in strength is required to achieve the desired flavour of the coffee product.

In an embodiment, the coffee processing apparatus comprises both a water dispensing stage and a ground coffee dispensing stage under control of said controller, wherein the ground coffee dispensing stage is arranged to dispense a third amount of ground coffee beans into said brewing stage, said third amount being determined as a function of said total concentration. In this embodiment, both the water dispensing stage and a ground coffee dispensing stage may be controlled in a synergistic manner to achieve the desired flavour of the brewed coffee product. In a particularly advantageous embodiment, the controller may be adapted to dispense a ratio of ground coffee beans and water into the brewing stage, said ratio being determined as a function of said total concentration.

To this end, the coffee processing apparatus may further comprise a data storage element including a lookup table comprising a plurality of said ratios, wherein each ratio is associated with a particular total concentration of said volatile organic compounds such that the controller can look up the appropriate ratio for controlling the water dispensing stage and the ground coffee dispensing stage in response to the detected total concentration of VOCs.

In an embodiment, the ground coffee dispensing stage includes the grinding stage such that the ground coffee beans may be produced in situ.

The coffee processing apparatus may further comprise a user interface, wherein the controller is arranged to control said grinding stage and/or said brewing stage as a function of said total concentration and a user input provided through said user interface. For instance, a user may define the desired strength of the coffee product to be brewed, wherein the controller may select the appropriate control parameters for the strength selected by the user in response to the determination of the total concentration of VOCs released by the (ground) coffee beans.

According to another aspect, there is provided a method of controlling a grinding stage and/or brewing stage of a coffee processing apparatus, the method comprising determining the total concentration of volatile organic compounds released by whole or ground coffee beans; selecting a grinding and/or brewing condition in response to the determined total concentration; and controlling the grinding stage and/or brewing stage in accordance with the selected condition. This facilitates the brewing of a coffee product with a more consistent flavour, regardless of the age or condition of the coffee beans used in the brewing process.

The selecting step may comprise determining a ratio of ground coffee beans to hot water for the brewing process in response to the determined total concentration; and the controlling step may comprises brewing the coffee in accordance with the determined ratio. This is particularly advantageous manner of controlling such a process, as it delivers a brewed coffee product with a particularly consistent flavour regardless of the age or condition of the coffee beans.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
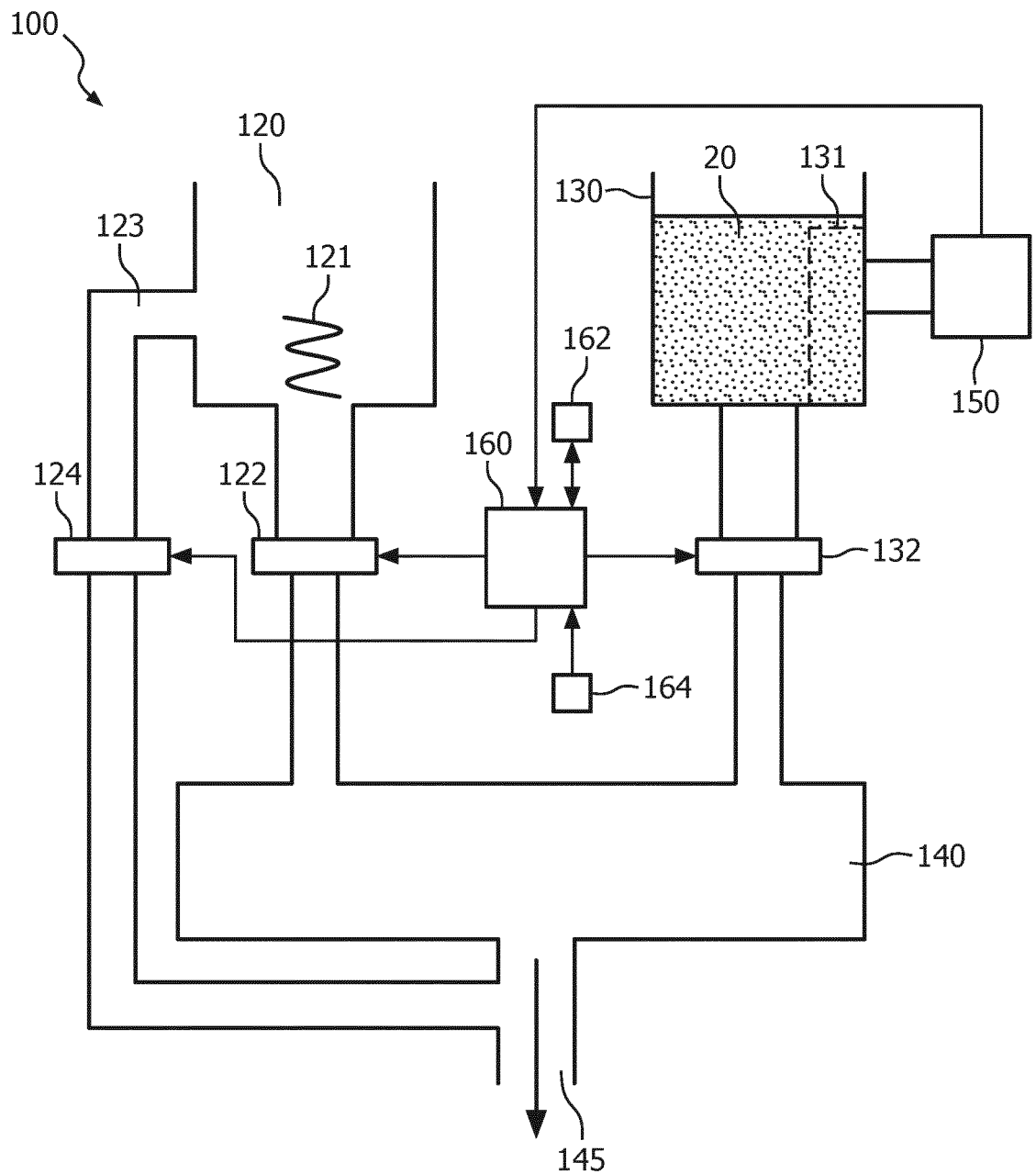
FIG. 1 schematically depicts a coffee brewing apparatus according to an embodiment.

It should be understood that the Figures are merely schematic and are not drawn to scale. It should also be understood that the same reference numerals are used throughout the Figures to indicate the same or similar parts unless specifically mentioned otherwise.

In the context of the present invention, VOCs are organic compounds, that have a defined minimum vapour pressure at room temperature (298K or 25° C.), e.g. organic compounds having a boiling point of less than or equal to 250° C., e.g. a boiling point in the range of 50-250° C. The total concentration of VOCs may be the total concentration of all VOCs released by the coffee beans 10 that can be detected by a VOC sensor or alternatively may be the total concentration of a selection of VOCs released by the coffee beans 10 that can be detected by a VOC sensor, e.g. a VOC sensor capable of detecting said selection only.

In the context of the present application, a coffee processing apparatus is an apparatus that processes roasted coffee beans as a function of the total concentration of VOCs released by the roasted coffee beans in order to facilitate the brewing of a coffee product from ground coffee beans, wherein at least one of the amount and granularity of the ground coffee beans is controlled in order to ensure that a coffee product may be brewed having a consistent flavour, i.e. a flavour that is largely independent of the age and/or quality of the ground coffee beans. Such coffee processing may include grinding of roasted coffee beans, wherein the grinding process may be controlled as a function of the total concentration of VOCs released by the roasted coffee beans or ground coffee beans produced in the grinding process. The coffee processing apparatus for instance may be a coffee grinding apparatus for producing ground coffee in accordance with desired brewing parameters. The coffee processing apparatus may be a coffee brewing apparatus, wherein the parameters of the brewing process such as the amount of hot water, the amount and/or granularity of the ground coffee beans and/or a ratio between the amount of hot water and the amount of ground coffee beans are determined as a function of the total concentration of VOCs released by the roasted coffee beans or ground coffee beans to control the brewing process such that a coffee product is brewed having a flavour that is largely independent of the age and/or a quality of the ground coffee beans used in the brewing process. Such a coffee brewing apparatus may or may not include the coffee grinding apparatus.

The present invention is based on the insight provided by the inventors that roasted coffee beans, either in ground or whole form, have a condition-dependent release profile of VOCs. To this end, the inventors have performed a series of measurements on different types of coffee beans of different age and stored on the different conditions to demonstrate this principle, in which the total concentration of VOCs (in ppb) released by 45 g of whole coffee beans was measured using a VOC sensor. The measurement results are summarised in Table 1. In Table 1, YG refers to Yirgacheffe beans and ML refers to Mandheling beans. "Newly open" refers to measurements performed directly after opening a vacuum sealed bag containing the beans, "Open 7 days" refers to measurements performed 7 days after opening the bag, "Open 14 days" refers to measurements performed 14 days after opening the bag and "long time open storage" refers to measurements performed on the beans after the storage bag has been opened for at least two months.

TABLE 1

| Newly open | |
|---|---|
| Newly roasted (YG) | 208.1 |
| Newly roasted (ML) | 140 |
| 8-month age beans (YG) | 122.8 |
| 11 month age beans (YG) | 110.3 |
| 14 months age beans (ML) | 141.9 |
| Open 7 days | |
| 11 months age beans (ML) | 64 |
| 8-month age beans (YG) | 72 |
| Newly roasted (ML) | 164 |
| Open 14 days | |
| Newly roasted (YG) | 56 |
| Long time open storage | |
| Open 15 months (YG) | 10.05 |
| Open 14 months (ML) | 29.55 |

Table I clearly demonstrates some consistent trends. If the coffee beans are kept in a well-sealed container, e.g. a vacuum-sealed bag, upon opening the coffee beans all contain a relatively high total VOC (TVOC) content, i.e. exhibit minimal aging effects. However, once the sealed container has been opened, the total VOC content of older coffee beans will drop to around 60 after 7 days, whereas fresher coffee beans show a much less pronounced drop or even a small increase in total VOC content. It has further been found that the flavour of the coffee produced from these coffee beans is strongly correlated to the TVOC content of the coffee beans by performing blind tests involving professional baristas. Some key findings of these tests are provided in Table 2. In these blind tests, Mandheling coffee beans were used and freshly ground to brew the coffee product.

TABLE 2

| Sample number | TVOC | Brewing scheme (by drip-filter brewing) | Sensory comments from barista |
|---|---|---|---|
| S1 | 141.9 | Bean:Water = 1:15 | Rich of flavor, good |
| S2 | 29.55 | Bean:Water = 1:15 | Very weak, no obvious flavor, boring, unacceptable |
| S3 | 29.55 | Bean:Water = 1:8, afterwards, 20 ml hot water is added to the coffee brew | Smooth, clear, comparable sensory result with S1. |

These experiments clearly demonstrate that controlling the brewing process as a function of the total concentration of VOCs released by the coffee beans, the flavor of the brewed coffee product can be controlled in order to achieve improved consistency in the quality of a brewed coffee product by adjusting brewing parameters as a function of the total concentration of VOCs. In the above experiment, it has been demonstrated that for instance the bean/water ratio may be chosen in accordance with the determined total concentration of VOCs in order to achieve good consistency in the coffee brewing process. Although not shown in Table 2, it has further been determined that the granularity of the ground coffee is a further parameter that may be used to improve the consistency of the coffee brewing process, as will be explained in further detail below.

Further experiments have demonstrated that this correlation exists for whole roasted coffee beans as well as for ground coffee beans. This is demonstrated in Table 3, which depicts the total concentration of VOCs released by Costa Rica and Golden Mandheling ground coffee beans at a certain amount of time after opening a vacuum sealed bag containing the ground coffee.

TABLE 3

| Time (min) | TVOC (ppb) Costa Rica | TVOC (ppb) Mandheling |
|---|---|---|
| 0 | 2615 | 1262 |
| 5 | 1064 | 684 |
| 10 | 783 | 615 |
| 15 | 751 | 504 |
| 20 | 620 | 519 |
| 25 | 639 | 473 |
| 30 | 625 | 482 |
| 35 | 656 | 477 |
| 360 (6 hours) | 179 | Not measured |
| 1440 (24 hours) | 64 | Not measured |
| 2880 (48 hours) | 30 | Not measured |

In Table 3, the total concentration of VOCs (TVOC) has been averaged over three independent experiments. Blind tests involving professional baristas in which a coffee product was brewed from ground coffee beans releasing different amounts of VOCs, i.e. ground coffee beans exposed to air for different periods of time, confirmed that adjustment of the brewing conditions could compensate for the loss of taste from the brewed coffee product. These results are summarized in Table 4, in which the baristas were exposed to three different coffee products brewed from Costa Rica coffee beans. The first sample was brewed immediately after opening the ground coffee bag. The second and third samples were brewed 24 hours after opening the ground coffee bag.

TABLE 4

| Sample | TVOC (ppb) | Amount of water (ml) | Comments |
|---|---|---|---|
| 1 | 2615 | 150 | Taste and flavor is rich and fresh |
| 2 | 64 | 150 | Almost no taste, poor sensory |
| 3 | 64 | 80 | Good sensory, obviously improved. Strong body, strong acidity |

In the below described embodiments of the present invention, these insights are utilized to provide a coffee processing apparatus and methods of controlling such a coffee processing apparatus in which the total concentration of VOCs released by the coffee beans either in whole or ground form is determined for the purposes of facilitating a brewing process leading to a brewed coffee product with consistent characteristics, e.g. flavour and smell.

FIG. 1 schematically depicts a coffee brewing apparatus 100 comprising a brewing stage 140 including a water dispensing stage 120 and a ground coffee dispensing stage 130 for dispensing hot water and ground coffee 20 into the brewing stage 140. The brewing stage 140 further has an outlet 145 for dispensing the brewed coffee product into a suitable container, e.g. a coffee cup or mug, a coffee jar or pot, and so on.

The coffee brewing apparatus 100 further comprises a controller 160 for controlling the dispensing of water and ground coffee 20 into the brewing stage 140. For instance, the water dispensing stage 120 may comprise a water dispensing valve 122 or the like and the ground coffee dispensing stage 130 may contain a ground coffee dispensing valve 132 or the like under control of the controller 160. The controller 160 may be a single controller or a distributed controller comprising separate sub-controllers under control of a master controller, as is well known per se. Any suitable controller architecture may be used. As shown in FIG. 1, the water dispensing stage 120 further comprises a heating element 121, e.g. a heating coil or the like, which may be placed upstream (as shown) or downstream from the water dispensing valve 122, such that the metered amount of water may be heated before or after metering.

The controller 160 is responsive to a VOC sensor 150 (simply referred to as the sensor below) for determining the total concentration of VOCs in the ground coffee dispensing stage 130. To this end, the sensor 150 is in fluid communication with the ground coffee dispensing stage 130. Such sensors are well-known per se and are therefore not explained in further detail for the sake of brevity only. Any suitable VOC sensor may be used as the sensor 150.

In an embodiment, the ground coffee dispensing stage 130 comprises a compartment 131 that during normal use of the coffee brewing apparatus 100 is entirely filled with the ground coffee beans 20 such that the sensor 150 determines the total VOC concentration from a known or metered amount of the ground coffee beans 20. As the total concentration of VOCs is typically a function of the amount of ground coffee beans releasing the VOCs, ensuring that the total concentration of VOCs is determined from a fixed (known) amount of ground coffee beans 20 obviates the need to determine, e.g. weigh, the amount of ground coffee beans 20 when determining the total VOC concentration, e.g. to determine the amount of VOCs released by a unit amount of ground coffee beans 20. It will of course be understood that in the compartment 131 may be omitted and that the coffee brewing apparatus 100 instead may determine the actual amount of ground coffee beans 20 in the ground coffee dispensing stage 130, e.g. by weighing or determining the volume occupied by the ground coffee beans 20 in order to determine the amount of VOCs released by a unit amount of ground coffee beans 20.

The controller 160 is typically adapted to control at least one of the water dispensing stage 120 and the ground coffee dispensing stage 130 of the brewing stage 140 in response to the TVOC is determined by the sensor 150, for instance to control the ratio of water to ground coffee is a function of the determined TVOC as previously explained. The actual TVOC may be determined by the controller 160 from a sensor reading provided by the sensor 150. Alternatively, the actual TVOC may be determined by a separate processor and passed on to the controller 160. The separate processor may form part of the sensor 150 or may be external thereto.

The controller 160 for instance may have access to a data storage element 162 containing a lookup table in which the applicable ratios as a function of TVOC are stored. Table 5 provides a simplified and non-limiting example of such a lookup table.

TABLE 5

| TVOC value (45 g beans) | Brewing scheme (ratio of bean:water) - where applicable | Grinding scheme- where applicable) |
| --- | --- | --- |
| >160 | 1:15 | Very coarse |
| 160-110 | 1:14 | coarse-middle |

TABLE 5-continued

| TVOC value (45 g beans) | Brewing scheme (ratio of bean:water) - where applicable | Grinding scheme- where applicable) |
| --- | --- | --- |
| 110-70 | 1:12 | Middle |
| 70-40 | 1:10, add 20% hot water to the coffee brew | Middle-fine |
| <40 | 1:8, add 20% hot water to the coffee brew | Fine grinding |

The contents of such a lookup table may be created empirically, for instance using taste experiments to determine for a given TVOC value what the appropriate ratio of ground coffee beans to water is. Such experiments make further include variation of the granularity of the ground coffee beans in order to determine the appropriate granularity, i.e. the degree of grinding, as a function of a particular TVOC value.

In an embodiment, the data storage element 162 may comprise a plurality of such lookup tables, for instance different lookup tables for different types of coffee beans in order to factor in the bean type-dependent differences in TVOC content that for instance are apparent from Table 1. To this end, the coffee brewing apparatus 100 may further comprise a user interface 164 that allows a user to specify the type of beans used in the brewing process such that the controller 160 can look up the appropriate lookup table in response to a specified bean type. The user interface 164 may further be used to specify other desired characteristics of the coffee product to be brewed, e.g. strength, in which case the lookup tables in the data storage element 162 may comprise bean to water ratios that our function of TVOC value and optionally strength and/or bean type.

The data storage element 162 may be implemented in any suitable manner, e.g. using any suitable non-volatile storage element, e.g. a ROM, EEPROM, Flash memory and so on. Similarly, the user interface 164 may be implemented in any suitable manner, e.g. using a dial, a series of buttons, a programmable display, which may be a touch-screen display and so on.

In an embodiment, the controller 160 is adapted to only vary the amount of ground coffee to be used in the brewing process and dispense an amount of hot water that is independent of the TVOC value, i.e. constant, in order to ensure that the total amount of brewed coffee product does not become variable, i.e. a function of the determined TVOC value.

In another embodiment, the controller 160 may be adapted to alter, e.g. reduce, the amount of water passed from the water dispensing stage 120 the brewing stage 140 and add water, preferably hot water, to the brewed coffee product in order to achieve the brewed coffee product having the desired characteristics, i.e. flavour and/or smell, as indicated in the example lookup table shown in Table 3. To this end, the coffee brewing apparatus may by way of non-limiting example comprise a bypass 123 from the water dispensing stage 122 the outlet 145 that bypasses the brewing stage 140, which bypass 123 may include a dispensing member 124 such as a valve under control of the controller 160 to regulate the amount of (hot) water dispensed into the brewed coffee product. As will be apparent to the skilled person, any suitable arrangement for dispensing a metered amount of water as a function of the determined total concentration of VOCs may be contemplated. The amount of water dispensed through respective dispensing elements 122 and 124 may be controlled such that the total amount of dispensed water is constant, i.e. ensures that the brewed amount of coffee does not become a function of the determined total concentration of VOCs. Alternatively, the total amount of water dispensed in this manner may vary as a function of the TVOC amount.

Figure 2:
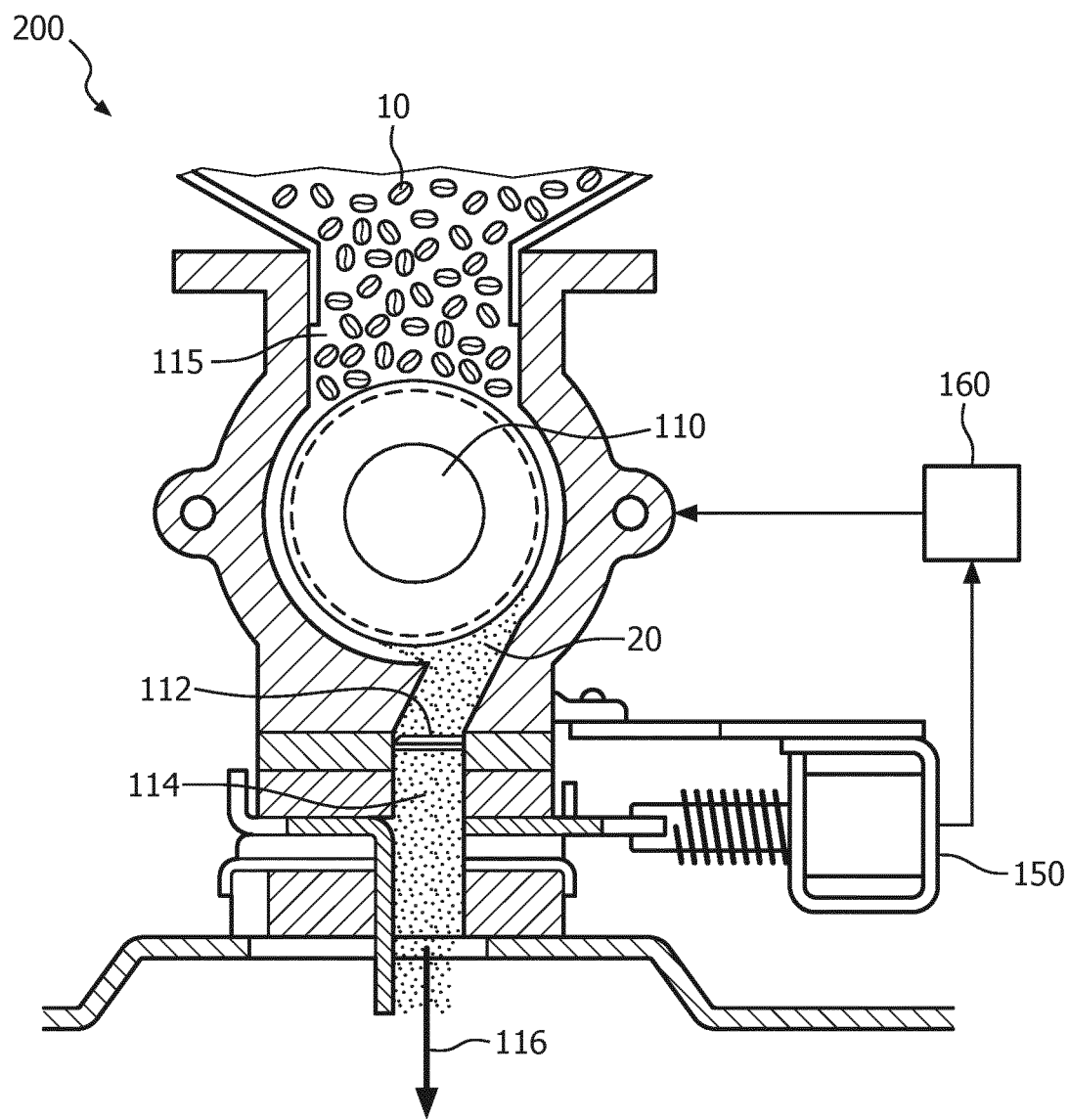
FIG. 2 schematically depicts a coffee grinding apparatus according to an embodiment.
Figure 3:
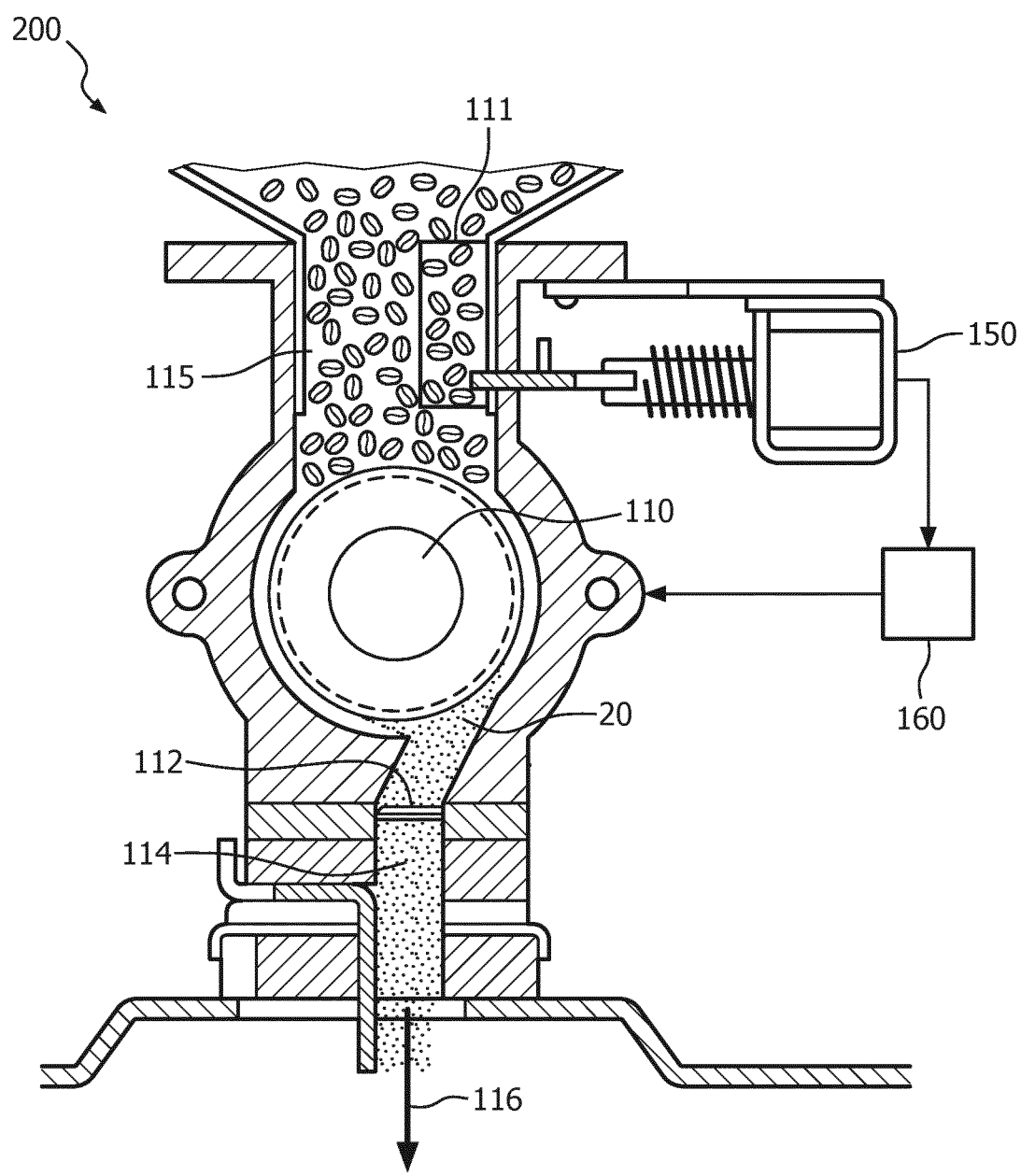
FIG. 3 schematically depicts a coffee grinding apparatus according to an alternative embodiment.

FIGS. 2 and 3 schematically depict coffee processing apparatuses according to another embodiment, namely a coffee grinding apparatus 200 including a grinding stage 110 under control of the controller 160 for producing ground coffee beans 20 from roasted coffee beans 10 in accordance with the TVOC determined by the sensor 150. The coffee grinding apparatus 200 typically comprises a chamber 115 for holding the roasted coffee beans 10 and a downstream compartment 114 for holding the ground coffee beans 20. In FIG. 2, the sensor 150 is in fluid communication with the downstream compartment 114 whereas in FIG. 3 the sensor 150 is in fluid communication with the chamber 115, which in an embodiment comprises a compartment 111 for holding a metered amount of the roasted coffee beans 10 such that the amount of roasted coffee beans 10 does not require determining as previously explained. In FIG. 2, such a metered amount may be provided by the coffee grinding apparatus 200 being arranged to grind a fixed amount of roasted coffee beans 10 to produce a fixed amount of ground coffee beans 20. Alternatively or additionally, the coffee grinding apparatus 200 may include a dispensing element 112, e.g. a valve, shutter or the like, which may be controlled such that part of the downstream compartment 114 is sealed off during the determination of the total concentration of VOCs, such that by filling up this sealed off portion of the compartment 114 with the ground coffee beans 20 a metered portion of the ground coffee beans 20 is produced.

The controller 160 is typically adapted to operate the coffee grinding apparatus 200 in accordance with the determined total concentration of VOCs as determined directly or indirectly by the sensor 150. For instance, the controller 160 may be adapted to control the grinding stage 110 in order to control the granularity of the ground coffee beans 20 produced by the grinding stage 110, e.g. finely or coarsely ground coffee beans, and/or may be adapted to control the dispensing element 112 in order to control the amount of ground coffee to be dispensed through outlet 116. Although not specifically shown in FIGS. 2 and 3, the coffee grinding apparatus 200 typically further comprises a data storage element for storing a lookup table that specifies the operating parameters of the coffee grinding apparatus 200 as a function of the determined total concentration of VOCs and may further comprise a user interface as previously explained, for instance to allow a user to specify a particular characteristic of a coffee product to be brewed, e.g. the strength of this coffee product, and/or the type of roasted coffee beans used in the coffee grinding process such that the controller 160 can select the appropriate operating parameters for the coffee grinding process in accordance with these selected user preferences.

Figure 4:
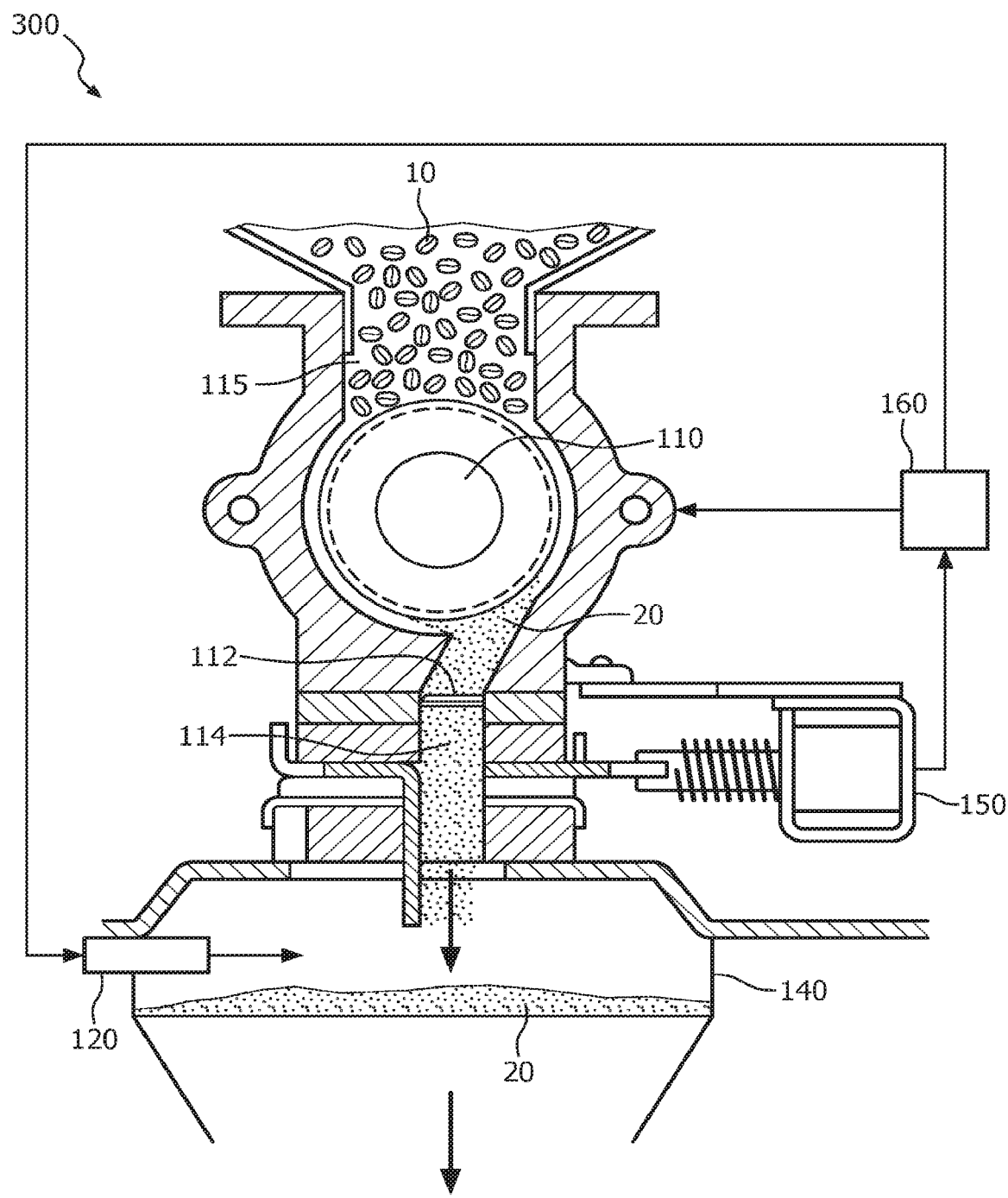
FIG. 4 schematically depicts a coffee brewing apparatus including the coffee grinding apparatus of FIG. 2.
Figure 5:
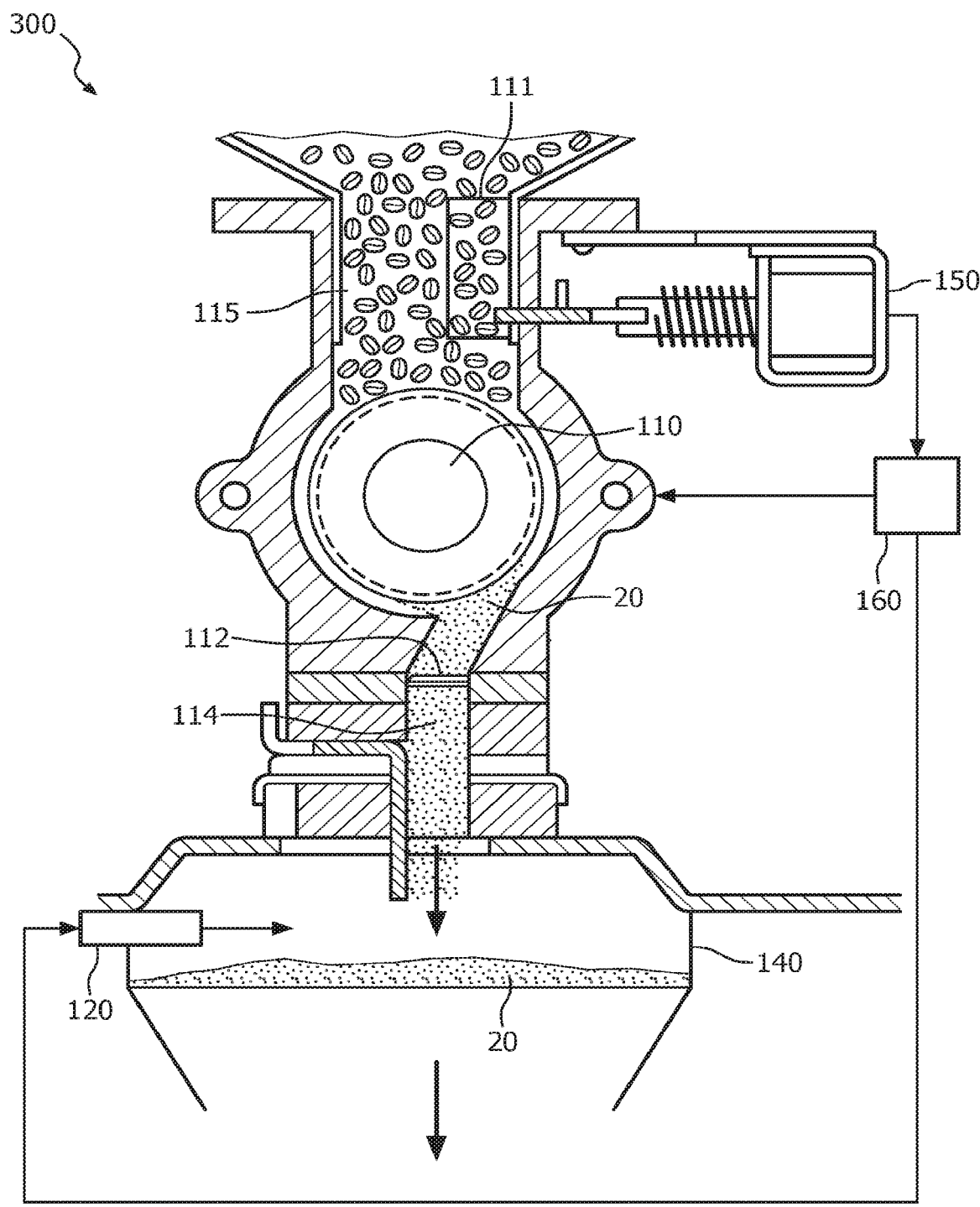
FIG. 5 schematically depicts a coffee brewing apparatus including the coffee grinding apparatus of FIG. 3.

Such a coffee grinding apparatus 200 may be a standalone coffee processing apparatus or may be used as a coffee grinding module in a coffee brewing apparatus to produce freshly ground coffee 20 for the coffee brewing process. FIG. 4 schematically depicts a coffee brewing apparatus 300 including the coffee grinding apparatus of FIG. 2 and FIG. 5 schematically depicts a coffee brewing apparatus 300 including the coffee grinding apparatus of FIG. 3. As explained in more detail with the aid of FIG. 1, such a coffee brewing apparatus may have a controller 160 that controls at least one of the water dispensing stage 120 and the ground coffee dispensing stage 130, here embodied by the coffee grinding apparatus, in accordance with the detected total concentration of VOCs released by the whole roasted coffee beans 10 or the ground coffee beans 20, for instance by controlling the ratio of hot water and ground coffee beans used in the brewing process as previously explained. In an embodiment, the dispensing element 112 essentially performs the function of the dispensing element 132 shown in FIG. 1.

Although not explicitly shown in FIGS. 4 and 5, it will be understood that the water dispensing stage 120 of the coffee brewing apparatus 300 may further comprise a bypass of the brewing stage 140 under control of the controller 160 to dilute the brewed coffee product with (hot) water in accordance with the brewing parameters in the data storage element (not shown in FIGS. 4 and 5) as previously explained. It will furthermore be apparent that the coffee brewing apparatus 300 may further comprise the previously explained user interface (not shown in FIGS. 4 and 5) to provide the controller 160 with user information such as coffee bean type and brewing preferences as explained in more detail above.

In short, the coffee brewing apparatus 300 may be the same as the coffee brewing apparatus 100 with the addition of the coffee grinding stage provided by a coffee grinding apparatus 200 as shown in FIGS. 2 and 3 respectively.

Figure 6:
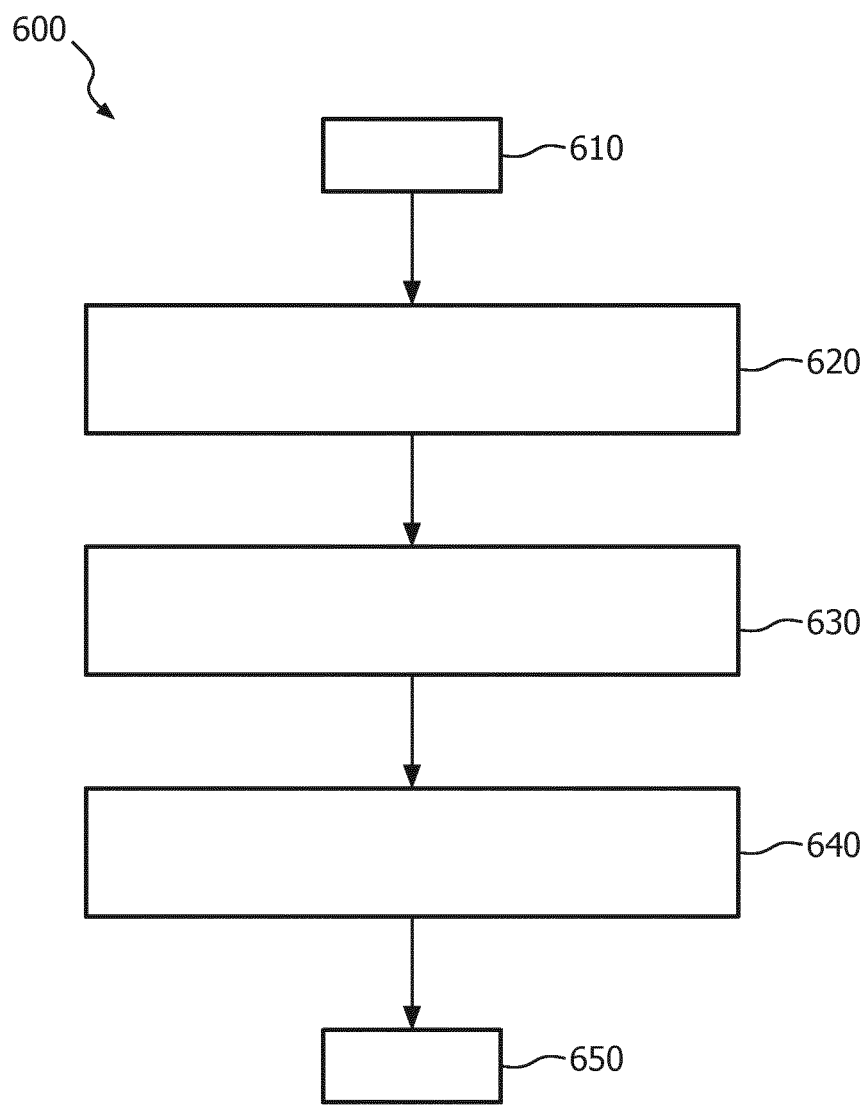
FIG. 6 schematically depicts a method of grinding coffee for a coffee brewing process according to an embodiment.

The coffee grinding apparatus 200, either in isolation or as part of the coffee brewing apparatus 300, may be operated in accordance with the method 600, a flowchart of which is depicted in FIG. 6. The method 600 starts in step 610 by starting up the coffee grinding apparatus 200, after which the method 600 proceeds to step 620 in which the total concentration of VOCs released by the whole coffee beans 10 or the ground coffee beans 20 is determined using the sensor 150. Subsequently, in step 630 the grinding parameters such as amount of coffee beans to be ground and granularity of the grind are determined by the controller 160 in accordance with the determined TVOC, after which the coffee beans 10 are ground in accordance with the selected grinding parameters in step 640 by controlling the grinding stage 110 in accordance with these parameters before the method 600 terminates in step 650.

Figure 7:
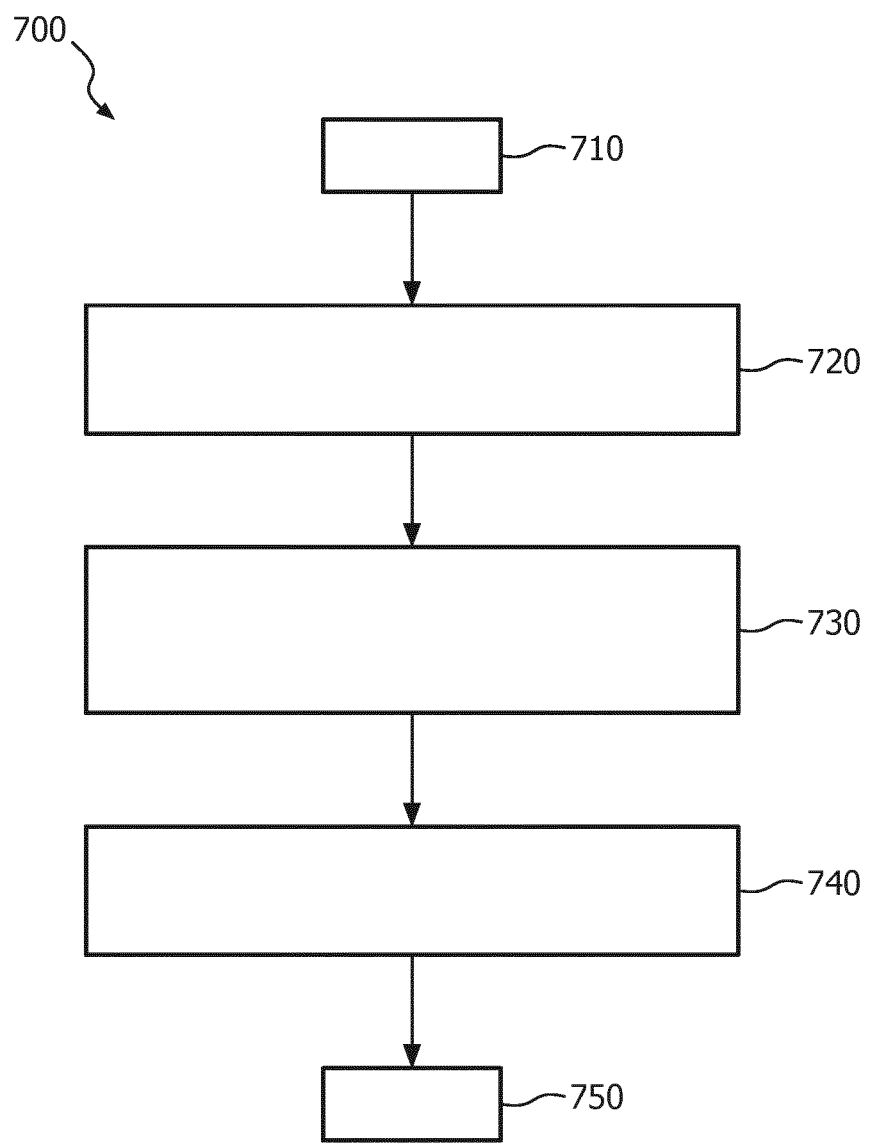
FIG. 7 schematically depicts a method of brewing coffee according to another embodiment.

The coffee brewing apparatus 100 or 300 may be operated in accordance with the method 700, a flowchart of which is depicted in FIG. 7. The method 700 starts in step 710 by starting up the coffee brewing apparatus 100 or 300, after which the method proceeds to step 720 in which the total concentration of VOCs released by the whole coffee beans 10 or the ground coffee beans 20 is determined using the sensor 150. Subsequently, in step 730 the brewing parameters such as the ratio of hot water and ground coffee beans 20 as previously explained and, if applicable, the granularity of the ground coffee beans 20, in case of a coffee brewing apparatus 300 including a coffee grinding stage, are determined by the controller 160 by looking up of these parameters in the data storage element 162 as a function of the determined TVOC, after which the coffee product is brewed in step 740 in accordance with the retrieved parameters. This step may include the grinding of the roasted coffee beans 10 in accordance with the retrieve parameters as previously explained. After brewing the coffee product, the method 700 terminates in step 750.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A coffee processing apparatus comprising:
a grinding stage for grinding coffee beans into ground coffee beans; and
a brewing stage for brewing coffee from the ground coffee beans;
the coffee processing apparatus further comprising:
a sensor; and
a controller responsive to said sensor;
wherein:
the sensor is configured to sense a total concentration of volatile organic compounds released by said coffee beans in accordance with a condition dependent release profile of said coffee beans,
the controller is configured to control said grinding stage as a function of said total concentration of volatile organic compounds, and wherein the controller is further configured to control the brewing stage as the function of said total concentration of volatile organic compounds.

2. The coffee processing apparatus of claim 1, wherein the sensor is configured to sense the total concentration of volatile organic compounds released by said coffee beans in a container of the grinding stage.

3. The coffee processing apparatus of claim 2, wherein the container comprises a compartment, and wherein the sensor is in fluid connection with said compartment.

4. The coffee processing apparatus of claim 1, wherein the grinding stage comprises a shutter for blocking release of the ground coffee beans, and wherein the controller is further configured to control said shutter as a function of said total concentration of volatile organic compounds.

5. The coffee processing apparatus of claim 1, wherein the brewing stage comprises a water dispensing stage, under control of said controller, configured to dispense a first amount of water onto the ground coffee beans, said first amount being determined as a function of said total concentration of volatile organic compounds.

6. The coffee processing apparatus of claim 5, wherein the water dispensing stage is further configured to dispense a second amount of water into coffee brewed by said brewing stage, said second amount being determined as a function of said total concentration of volatile organic compounds.

7. The coffee processing apparatus of claim 5, further comprising a ground coffee dispensing stage, under control of said controller, configured to dispense an amount of ground coffee beans into said brewing stage, said amount of ground coffee beans being determined as a function of said total concentration of volatile organic compounds.

8. The coffee processing apparatus of claim 7, wherein the controller is configured to dispense a ratio of the ground coffee beans and water into the brewing stage, said ratio being determined as a function of said total concentration of volatile organic compounds.

9. The coffee processing apparatus of claim 8, further comprising a data storage including a lookup table comprising a plurality of said ratios, wherein each ratio is associated with a particular total concentration of said volatile organic compounds.

10. The coffee processing apparatus of claim 7, wherein the ground coffee dispensing stage includes the grinding stage.

11. The coffee processing apparatus of claim 1, further comprising a user interface, wherein the controller is configured to control said grinding stage and said brewing stage as a function of said total concentration and a user input provided through said user interface.

12. A method of controlling a coffee processing apparatus, wherein the method comprises:
determining, by a sensor, a total concentration of volatile organic compounds released by whole coffee beans in accordance with a condition dependent release profile of said whole coffee beans;
selecting, by a controller, a grinding condition and a brewing condition in response to the determined total concentration; and
controlling, by the controller, a grinding stage and a brewing stage of the coffee processing apparatus in accordance with the selected grinding and brewing conditions to grind said coffee beans into ground coffee beans and brew coffee said ground coffee beans.

13. The method of controlling the coffee processing apparatus according to claim 12, wherein:
said selecting step comprises determining a ratio of said ground coffee beans to hot water for a brewing process in response to the determined total concentration.

14. The method of controlling the coffee processing apparatus according to claim 13, wherein said controlling step comprises brewing the coffee in accordance with the determined ratio.

15. The coffee processing apparatus of claim 3, wherein the compartment is arranged to hold a specific amount of the coffee beans for detection of said total concentration from the specific amount of coffee beans.

16. A coffee processing apparatus comprising:
a grinding stage for grinding coffee beans into ground coffee beans; and
a brewing stage for brewing coffee from the ground coffee beans;
the coffee processing apparatus further comprising:
a sensor; and
a controller responsive to said sensor;
wherein:
the sensor is configured to sense a total concentration of volatile organic compounds released by said coffee beans,
the controller is configured to control said grinding stage as a function of said total concentration of volatile organic compounds, and wherein the controller is further configured to control the brewing stage as the function of said total concentration of volatile organic compounds.

17. The coffee processing apparatus of claim 16, wherein the controller is further configured to control the grinding stage to control granularity of the ground coffee beans produced by the grinding stage.

18. The coffee processing apparatus of claim 16, wherein the controller is further configured to control an amount of the ground coffee beans to be dispensed through an outlet of the grinding stage.

* * * * *